US012633066B2

(12) United States Patent
Hsu et al.

(10) Patent No.: US 12,633,066 B2
(45) Date of Patent: May 19, 2026

(54) METHOD FOR RENDERING VIRTUAL OBJECT, HOST, AND COMPUTER READABLE STORAGE MEDIUM

(71) Applicant: HTC Corporation, Taoyuan City (TW)

(72) Inventors: Ting Yu Hsu, Taoyuan City (TW); Chia-Lun Ku, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 181 days.

(21) Appl. No.: 18/463,320

(22) Filed: Sep. 8, 2023

(65) Prior Publication Data

US 2025/0086902 A1      Mar. 13, 2025

(51) Int. Cl.
　　 *G06T 19/00* 　　(2011.01)
　　 *G06V 10/25* 　　(2022.01)
　　 *G06V 10/60* 　　(2022.01)
(52) U.S. Cl.
　　 CPC ............ *G06T 19/006* (2013.01); *G06V 10/25* (2022.01); *G06V 10/60* (2022.01)
(58) Field of Classification Search
　　 None
　　 See application file for complete search history.

(56) References Cited

U.S. PATENT DOCUMENTS 10,777,010 B1 　 9/2020 　Patel et al.
11,495,004 B1 * 11/2022 　Henry ................... G06T 19/006

2021/0279972 A1 　 9/2021 　Silverstein et al.
2023/0206568 A1 　 6/2023 　Du et al.
2023/0260228 A1 　 8/2023 　Jia et al.

FOREIGN PATENT DOCUMENTS

CN 　 111127624 　 5/2020
CN 　 113552942 　 10/2021
TW 　 I711966 　 12/2020

OTHER PUBLICATIONS

"Office Action of Taiwan Counterpart Application", issued on Jun. 27, 2024, p. 1-p. 9.
"Search Report of European Counterpart Application", issued on Oct. 22, 2024, p. 1-p. 4.

* cited by examiner

*Primary Examiner* — Robert J Craddock
(74) *Attorney, Agent, or Firm* — JCIPRNET

(57) ABSTRACT

The embodiments of the disclosure provide a method for rendering a virtual object, a host, and a computer readable storage medium. The method includes: determining a plurality of regions in an environment; determining lighting information of each of the plurality of regions; obtaining a to-be-rendered virtual object and selecting at least one candidate region corresponding to the to-be-rendered virtual object among the plurality of regions; determining a reference lighting information based on the lighting information of each of the at least one candidate region; and rendering the to-be-rendered virtual object based on the reference lighting information.

17 Claims, 5 Drawing Sheets

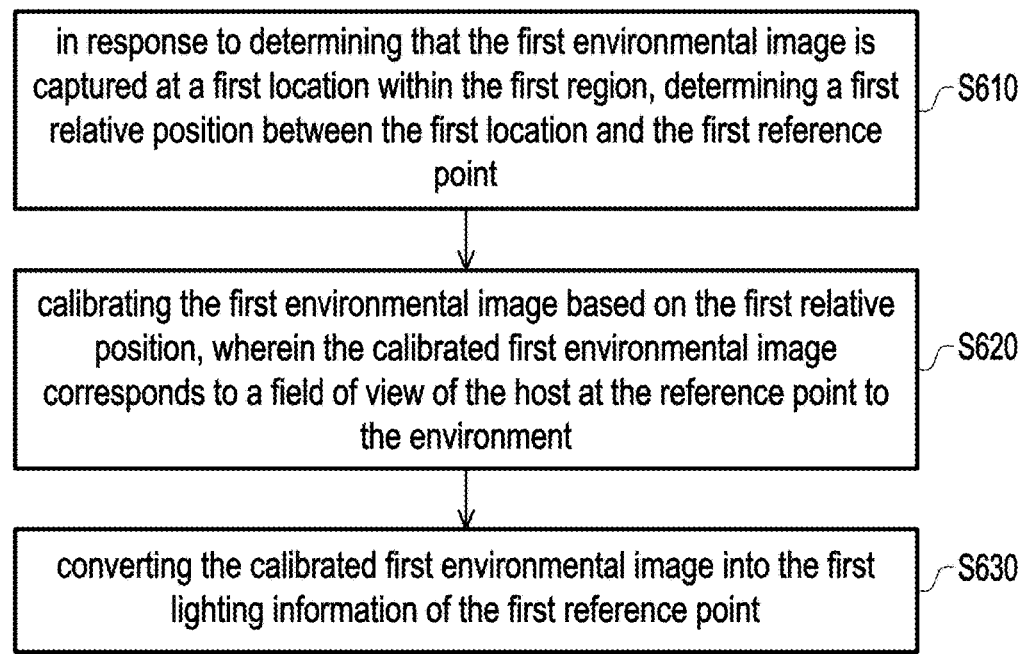

in response to determining that the first environmental image is captured at a first location within the first region, determining a first relative position between the first location and the first reference point ⌒S610 calibrating the first environmental image based on the first relative position, wherein the calibrated first environmental image corresponds to a field of view of the host at the reference point to the environment ⌒S620 converting the calibrated first environmental image into the first lighting information of the first reference point ⌒S630

FIG. 6A

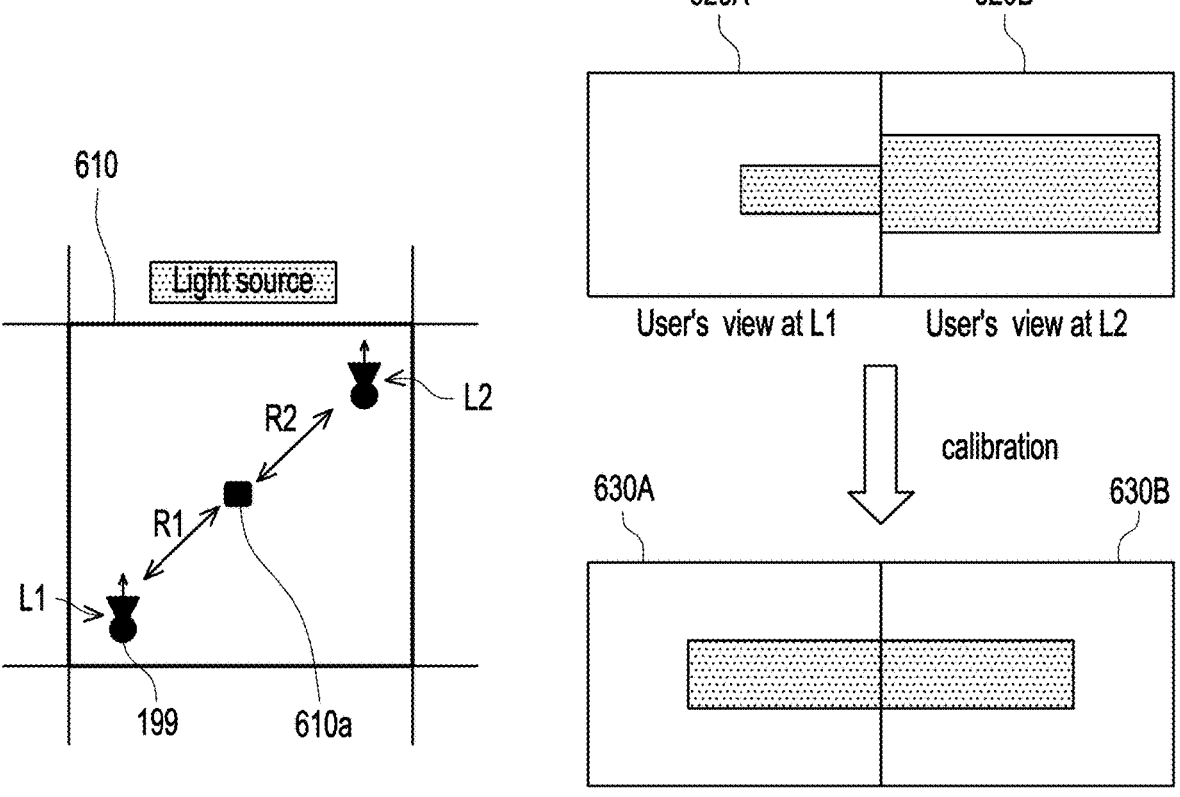

FIG. 6B

METHOD FOR RENDERING VIRTUAL OBJECT, HOST, AND COMPUTER READABLE STORAGE MEDIUM

BACKGROUND

1. Field of the Invention

The present disclosure generally relates to mechanism for generating visual contents, in particular, to a method for rendering a virtual object, a host, and a computer readable storage medium.

2. Description of Related Art

In reality services such as augmented reality (AR) or mixed reality (MR) services, the developers aim to seamlessly integrate virtual objects with the real world visually. To achieve this purpose, the reality system of the reality service needs to capture and store lighting information from the current scene/environment and use this stored lighting information to render virtual objects, such that the rendered virtual object can be looked like as being illuminated by the real environmental light.

In the art, lighting information refers to data and details about the lighting conditions in the environment. Lighting information is a crucial component of AR/MR applications as it helps virtual objects appear more realistic, consistent, and lifelike within the real world.

In general, lighting information encompasses the following aspects:

(1) Light source position and direction: Understanding the location and direction of light sources, such as the sun, light bulbs, or other sources, to ensure that virtual objects' shadows and highlights align with the actual environment.

(2) Light source intensity and color: Measuring the brightness and color of light sources to determine the color and brightness of virtual objects consistent with the surrounding environment.

(3) Environment reflection and refraction: Taking into account the material and reflective properties of object surfaces to simulate how light interacts with the surfaces, achieving a more realistic appearance through reflection and refraction effects.

(4) Shadows and occlusion: Generating appropriate shadow effects based on the light source's position and relationships between objects to make virtual objects look as if they belong in the real world.

(5) Ambient lighting: Considering the overall lighting levels in the environment to adjust the brightness of virtual objects, making them blend seamlessly with their surroundings.

In brief, lighting information in AR/MR applications is used to ensure that virtual objects are presented in a manner that harmonizes with the real-world environment, enhancing user perception and experience. This involves complex calculations and algorithms to simulate the behavior of light rays and the interaction of virtual objects with light, achieving high-quality augmented reality effects.

Typically, AR systems collect lighting information through cameras on AR devices (e.g., a head-mounted display (HMD) and/or a pair of AR glasses). Since light can come from any angle in the environment, the AR system needs to guide the user to look around the entire scene/environment, such that the AR device can collect complete lighting information of the entire scene/environment. Under this premise, when the lighting of the scene/environment changes for some reasons (e.g., the lights are turned on or off), the user needs to perform the above action (i.e., looking around the scene/environment) again to update the lighting information of the scene/environment.

Moreover, when the lighting in the environment is uneven, the AR device cannot obtain the complete lighting information by the user only looking around for once. This is because a single capture position cannot reflect the uneven lighting of the entire environment.

See FIG. 1, which shows the scenario of rendering virtual objects based on the lighting information captured in an environment with uneven lighting.

In FIG. 1, if a user 199 wearing an AR device 100 is in an environment 110 having a brighter region 111 and a darker region 112, the lighting information obtained when the user 199 locates at the darker region 112 would be improper to be used when the user 199 moves to the brighter region 111. Specifically, when the virtual object 120 rendered based on the lighting information corresponding to the darker region 112 is seen by the user 199 at the brighter region 111, the rendered virtual object 120 would seem to be dark, which would be inconsistent with the brighter region 111 where the user locates.

Likewise, the lighting information obtained when the user 199 locates at the brighter region 111 would be improper to be used when the user 199 moves to the darker region 112. Specifically, when the virtual object rendered based on the lighting information corresponding to the brighter region 111 is seen by the user 199 at the darker region 112, the rendered virtual object would seem to be bright, which would be inconsistent with the darker region 112 where the user 199 locates.

SUMMARY OF THE INVENTION

Accordingly, the disclosure is directed to a method for rendering a virtual object, a host, and a computer readable storage medium, which may be used to solve the above technical problems.

The embodiments of the disclosure provide a method for rendering a virtual object, applied to a host, including: determining a plurality of regions in an environment; determining lighting information of each of the plurality of regions; obtaining a to-be-rendered virtual object and selecting at least one candidate region corresponding to the to-be-rendered virtual object among the plurality of regions; determining a reference lighting information based on the lighting information of each of the at least one candidate region; and rendering the to-be-rendered virtual object based on the reference lighting information.

The embodiments of the disclosure provide a host including a storage circuit and a processor. The storage circuit stores a program code. The processor is coupled to the non-transitory storage circuit and accesses the program code to perform: determining a plurality of regions in an environment; determining lighting information of each of the plurality of regions; obtaining a to-be-rendered virtual object and selecting at least one candidate region corresponding to the to-be-rendered virtual object among the plurality of regions; determining a reference lighting information based on the lighting information of each of the at least one candidate region; and rendering the to-be-rendered virtual object based on the reference lighting information.

The embodiments of the disclosure provide a non-transitory computer readable storage medium, the computer readable storage medium recording an executable computer program, the executable computer program being loaded by a host to perform steps of: determining a plurality of regions in an environment; determining lighting information of each of the plurality of regions; obtaining a to-be-rendered virtual object and selecting at least one candidate region corresponding to the to-be-rendered virtual object among the plurality of regions; determining a reference lighting information based on the lighting information of each of the at least one candidate region; and rendering the to-be-rendered virtual object based on the reference lighting information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

FIG. 6A shows a flow chart of determining the first lighting information of the first reference point according to an embodiment of the disclosure.

FIG. 6B shows an application scenario according to FIG. 6A.

DESCRIPTION OF THE EMBODIMENTS

Figure 1:
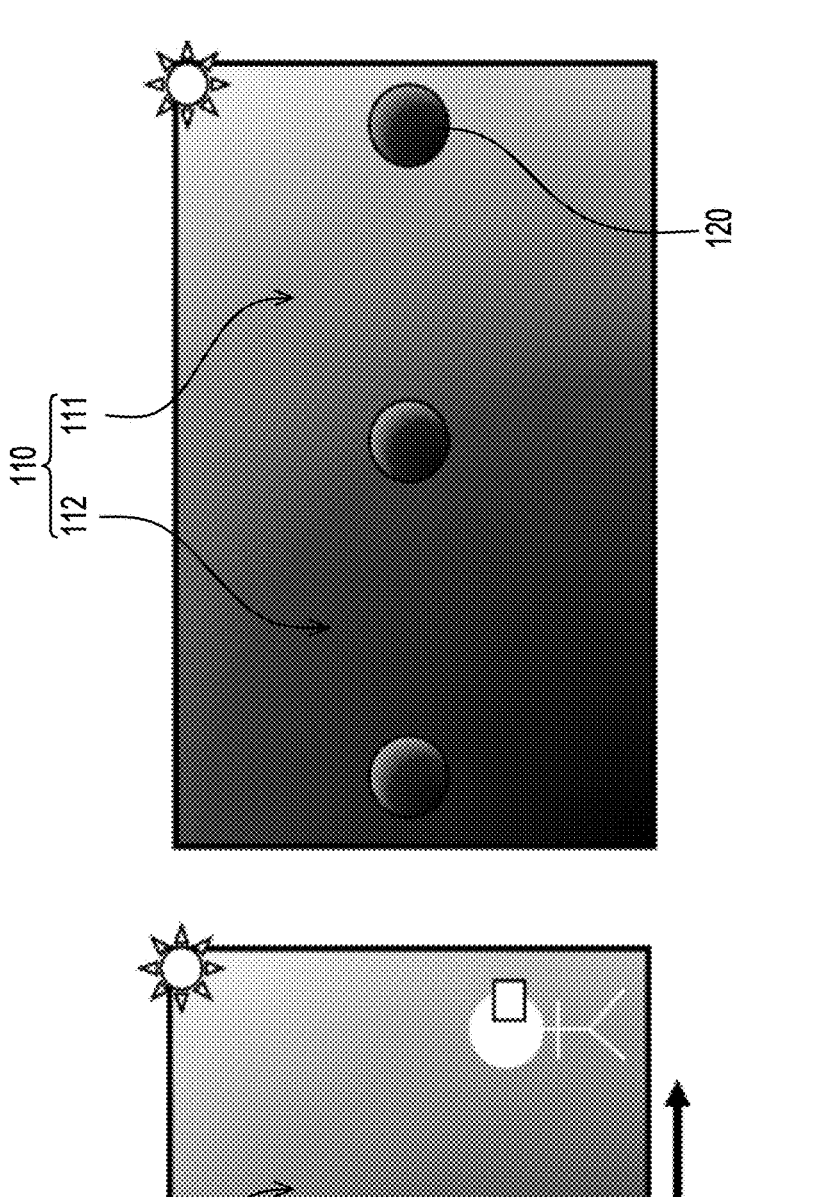
FIG. 1 shows the scenario of rendering virtual objects based on the lighting information captured in an environment with uneven lighting.

Reference will now be made in detail to the present preferred embodiments of the invention, examples of which are illustrated in the accompanying drawings. Wherever possible, the same reference numbers are used in the drawings and the description to refer to the same or like parts.

Figure 2:
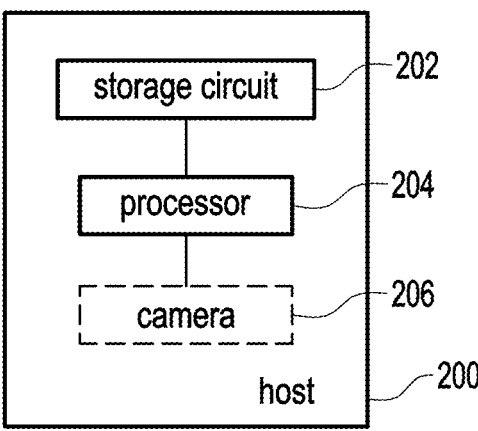
FIG. 2 shows a schematic diagram of a host according to an embodiment of the disclosure.

See FIG. 2, which shows a schematic diagram of a host according to an embodiment of the disclosure. In various embodiments, the host 200 can be any smart device/computer device. In some embodiments, the host 200 can be any electronic device capable of providing reality services (e.g., AR service, MR services, or the like). In some embodiments, the host 200 can be implemented as an AR device, such as a pair of AR glasses and/or an HMD, but the disclosure is not limited thereto.

In FIG. 2, the host 200 includes a storage circuit 202 and a processor 204. The storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 200 can further include one or more camera 206 coupled to the processor 204. The camera 206 could be any camera having charge coupled device (CCD) lens, complementary metal oxide semiconductor transistors (CMOS) lens or infrared lens. In the embodiments of the disclosure, the camera 206 can be used to capture environmental images of the scene/environment where the host 200 locates, wherein the environmental images may be panoramas and/or cubemaps, but the disclosure is not limited thereto.

In the embodiments of the disclosure, the processor 204 may access the modules and/or the program code stored in the storage circuit 202 to implement the method for rendering a virtual object provided in the disclosure, which would be further discussed in the following.

Figure 3:
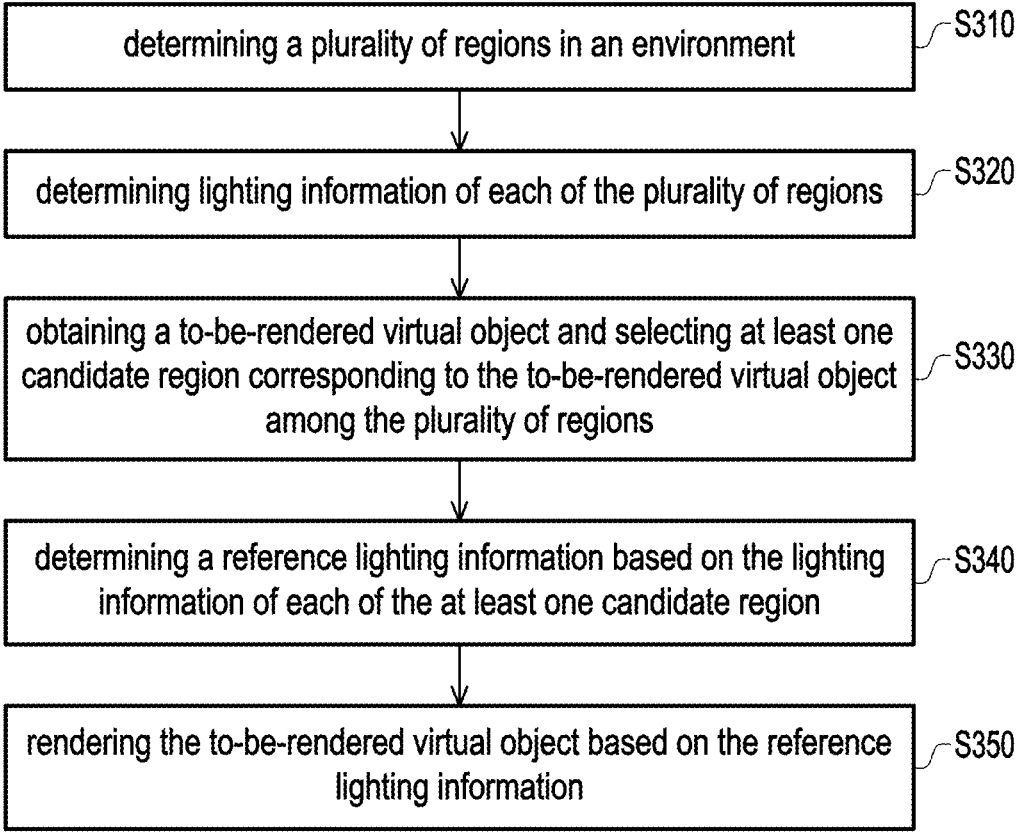
FIG. 3 shows a flow chart of the method for rendering a virtual object according to an embodiment of the disclosure.

See FIG. 3, which shows a flow chart of the method for rendering a virtual object according to an embodiment of the disclosure. The method of this embodiment may be executed by the host 200 in FIG. 2, and the details of each step in FIG. 3 will be described below with the components shown in FIG. 2.

In step S310, the processor 204 determines a plurality of regions in an environment. In one embodiment, the environment may be the scene/field where the host 200 and the user thereof locates, such as a room, a house, a gallery, but the disclosure is not limited thereto.

In one embodiment, the processor 204 can determine the regions in the environment based on the requirements of the designer.

For example, the processor 204 may scan the dimension/size/appearance of the environment and divide the environment into multiple 3D regions as the considered regions in step S310.

In one embodiment, since the user would more likely to move horizontally in the environment, the processor 204 may divide the environment into several 3D regions that are horizontally arranged in the environment.

In one embodiment, the processor 204 may divide the environment into several 3D regions arranged in grid.

In one embodiment, if the environment is disposed with one or more landmarks (e.g., furniture or other real objects), the processor 204 may divide the environment into the regions based on the landmarks.

Figure 4:
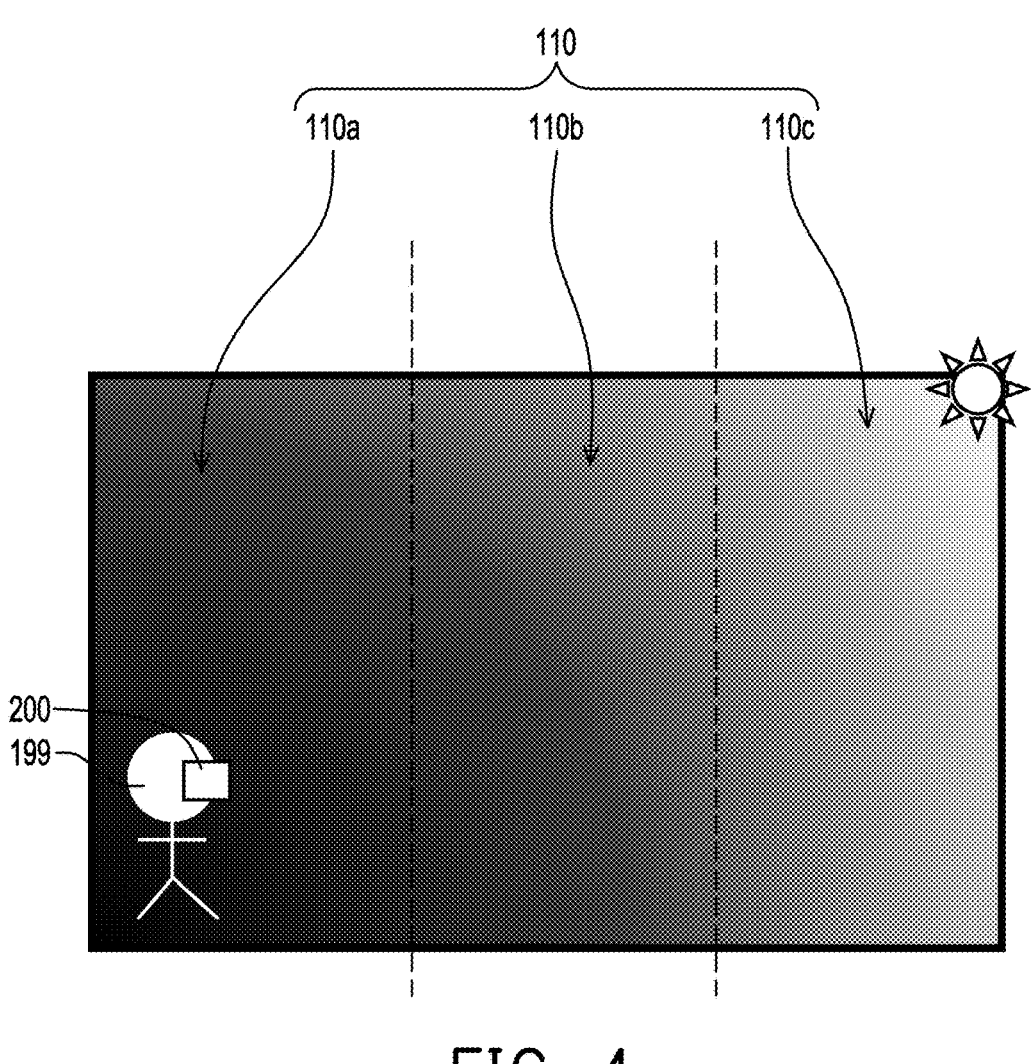
FIG. 4 shows a schematic diagram of the determined regions in the environment according to an embodiment of the disclosure.

See FIG. 4, which shows a schematic diagram of the determined regions in the environment according to an embodiment of the disclosure. In FIG. 4, after the processor 204 obtains the dimension/size/appearance of the environment 100, the processor 204 may divide the environment 110 into, for example, 3D regions 110a-110c, but the disclosure is not limited thereto.

In one embodiment, the processor 204 may determine the regions according to the settings of the designer. For example, the designer may determine the dimension/size/appearance of the environment 110 and the size/position/dimension of each of the regions 110a-110c in advance, and the designer may input this information into the reality service system (e.g., AR system) of the host 200. In this case, the processor 204 may directly determine the regions 110a-110c according to the information inputted by the designer, but the disclosure is not limited thereto.

For better understanding the concept of the disclosure, the application scenario in FIG. 4 would be used as an illustrative example, but the disclosure is not limited thereto.

In step S320, the processor 204 determine lighting information of each of the plurality of regions 110a-110c.

Figure 5:
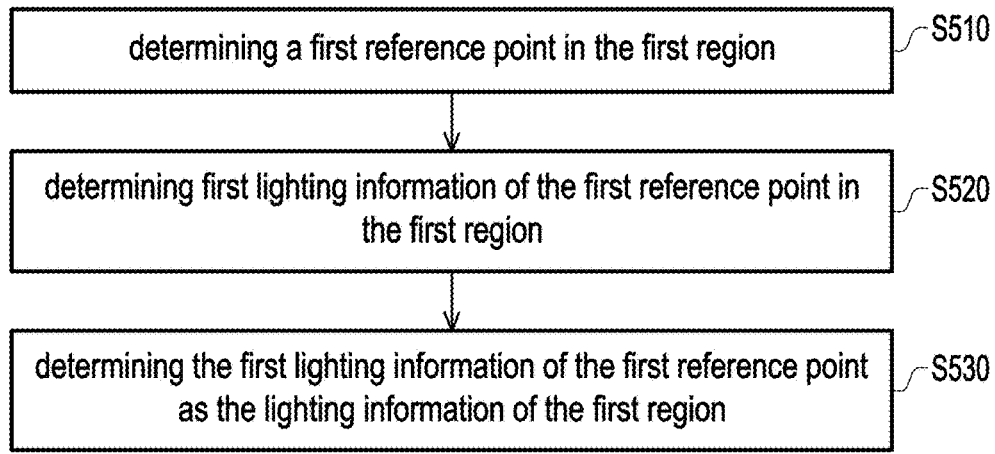
FIG. 5 shows a flow chart of determining the lighting information for the first region according to an embodiment of the disclosure.

In one embodiment, the processor 204 may perform steps in FIG. 5 for determining the lighting information for a first region in the regions 110a-110c.

See FIG. 5, which shows a flow chart of determining the lighting information for the first region according to an embodiment of the disclosure.

In step S510, the processor 204 determines a first reference point in the first region. In various embodiments, the first reference point can be any point locating within the first region, such as the center point of the first region, but the disclosure is not limited thereto.

In step S520, the processor 204 determines first lighting information of the first reference point in the first region.

In one embodiment, in response to determining that the host 200 locates in the first region, the processor 204 may control the camera 206 to capture a first environmental image associated with the first region, wherein the first environmental image may include at least one of a panorama and a cubemap. Next the processor 204 may determine the first lighting information of the first reference point in the first region based on the first environmental image associated with the first region.

In one embodiment, the processor 204 may perform steps in FIG. 6A for determining the first lighting information of the first reference point in the first region based on the first environmental image associated with the first region.

See FIG. 6A, which shows a flow chart of determining the first lighting information of the first reference point according to an embodiment of the disclosure.

In step S610, in response to determining that the first environmental image is captured at a first location within the first region, the processor 204 determines a first relative position between the first location and the first reference point.

In step S620, the processor 204 calibrates the first environmental image based on the first relative position, wherein the calibrated first environmental image corresponds to a viewing angle of the host at the first reference point to the environment.

In step S630, the processor 204 converts the calibrated first environmental image into the first lighting information of the first reference point.

For better understanding the concept of FIG. 6A, FIG. 6B would be used as an illustrative example, wherein FIG. 6B shows an application scenario according to FIG. 6A.

In FIG. 6B, the user 199 may wear an HMD as the corresponding host 200. In the embodiment, the HMD of the user 199 may capture a first environmental image 620A at a first location L1 within the first region 610 (which may be understood as one of the regions 110a-110c). In FIG. 6B, the viewing angle of the camera of the HMD of the user 199 may include a light source in the environment, such that the first environmental image 620A captures the light source, but the disclosure is not limited thereto.

In this case, the processor 204 may determine a first relative position R1 between the first reference point 610a of the first region 610 and the first location L1 and calibrate the first environmental image 620A based on the first relative position R1. As shown in FIG. 6B, the calibrated first environmental image 630A corresponds to a viewing angle of the HMD of the user 199 at the first reference point 610a to the environment.

After obtaining the calibrated first environmental image 620A, the HMD may convert the calibrated first environmental image 620A into the first lighting information of the first reference point 610a.

In another embodiment, the HMD of the user 199 may capture a first environmental image 620B at a first location L2 within the first region 610 (which may be understood as one of the regions 110a-110c). In FIG. 6B, the viewing angle of the camera of the HMD of the user 199 may also include the light source in the environment, such that the first environmental image 620B captures the light source, but the disclosure is not limited thereto.

In this case, the processor 204 may determine a first relative position R2 between the first reference point 610a of the first region 610 and the first location L2 and calibrate the first environmental image 620B based on the first relative position R2. As shown in FIG. 6B, the calibrated first environmental image 630B corresponds to a viewing angle of the HMD of the user 199 at the first reference point 610a to the environment.

After obtaining the calibrated first environmental image 620B, the HMD may convert the calibrated first environmental image 620B into the first lighting information of the first reference point 610a.

Referring back to FIG. 5, after determining the first lighting information of the first reference point (e.g., the first reference point 610a) in the first region (e.g., the first region 610), the processor 204 determines the first lighting information of the first reference point as the lighting information of the first region.

In one embodiment, the processor 204 may determine the lighting information for each of the regions 110a-110c based on the descriptions in the above.

In one embodiment, once the lighting information of the first region is determined, the processor 204 may accordingly determine the lighting information of a second region among the regions 110a-110c, wherein the second region may be adjacent to the first region.

Taking the scenario in FIG. 4 as an example, since the user 199 is in the region 110a, the region 110a may be considered as the first region, and the region 110b adjacent to the region 110a may be considered as the second region. In this case, the processor 204 may determine the lighting information of the region 110b according to the lighting information of the region 110a after determining the lighting information of the region 110a. In one embodiment, the processor 204 may directly determine the lighting information of the region 110b as the lighting information of the region 110a, or slightly modify the lighting information of the region 110a to generate the lighting information of the region 110b, but the disclosure is not limited thereto.

In one embodiment, the processor 204 may update the lighting information of at least one of the regions 110a-110c in response to the movement of the host 200. For example, when the user 199 moves from the region 110a to the region 110b, the processor 204 may further update the lighting information of the region 110b based on the descriptions associated with FIGS. 5, 6A, and 6B.

Since the region 110b can be seen as adjacent to the regions 110a and 110c, the processor 204 may regard each of the regions 110a and 110c as the corresponding second region. In this case, the processor 204 may determine the lighting information of the regions 110a and 110c according to the lighting information of the region 110b. In one embodiment, the processor 204 may directly determine the lighting information of the regions 110a and 110c as the lighting information of the region 110b, or slightly modify the lighting information of the region 110*b* to generate the lighting information of the regions 110*a* and 110*c* based on, for example, the position, orientation of the host 200 and/or the geographical information of the environment 110, but the disclosure is not limited thereto.

In some embodiments, the processor 204 can individually determine the lighting information of each of the regions 110*a*-110*c*. For example, when the user 199 is in the region 110*a*, the processor 204 can merely determine the lighting information of the region 110*a* based on the above discussions. When the user 199 moves from the region 110*a* to the region 110*b*, the processor 204 can merely determine the lighting information of the region 110*b* based on the above discussions. When the user 199 moves from the region 110*b* to the region 110*c*, the processor 204 can merely determine the lighting information of the region 110*c* based on the above discussions.

In one embodiment, if the user 199 moves from the region 110*c* back to the region 110*b*, the processor 204 can update the lighting information of the region 110*b* via determining the lighting information again based on the above teachings, but the disclosure is not limited thereto.

Referring back to FIG. 3, after determining the lighting information of each of the regions 110*a*-110*c*, the processor 204 performs step S330 to obtain a to-be-rendered virtual object and selecting at least one candidate region corresponding to the to-be-rendered virtual object among the plurality of regions.

In one embodiment, the to-be-rendered virtual object may be, for example, an AR object, which will be rendered for the user 199 to see.

In one embodiment, the to-be-rendered virtual object has a specific position in the visual content provided by the host 200 for the user 199 to see, wherein the specific position is the position where the virtual object will be displayed/shown after being rendered, but the disclosure is not limited thereto.

In the embodiments of the disclosure, the processor 204 can select at least one candidate region corresponding to the to-be-rendered virtual object among the regions 110*a*-110*c*.

In one embodiment, in response to determining that the to-be-rendered virtual object locates in the first region (i.e., the specific position of the to-be-rendered virtual object is within the first region), the processor 204 can at least select the first region as the at least one candidate region.

For example, if the to-be-rendered virtual object locates in the region 110*a*, the processor 204 may at least select the region 110*a* as one of the at least one candidate region.

In addition, in response to determining that the to-be-rendered virtual object locates in the first region (i.e., the specific position of the to-be-rendered virtual object is within the first region), the processor 204 can not only select the first region as the at least one candidate region, but can further select other regions near/adjacent to the first region as the at least one candidate region, such as the second region.

For example, if the to-be-rendered virtual object locates in the region 110*a*, the processor 204 may select the region 110*a* and the region 110*b* (which is adjacent to the region 110*a*) as the at least one candidate region.

For another example, if the to-be-rendered virtual object locates in the region 110*b*, the processor 204 may select the region 110*b* and the regions 110*a* and 110*c* (which are adjacent to the region 110*b*) as the at least one candidate region, but the disclosure is not limited thereto.

In step S340, the processor 204 determines a reference lighting information based on the lighting information of each of the at least one candidate region.

In one embodiment, the processor 204 may combine the lighting information of each of the at least one candidate region into the reference lighting information.

For example, if the processor 204 determines that the at least one candidate region includes the region 110*a*, the processor 204 may directly determine the reference lighting information as the lighting information of the region 110*a*.

For another example, if the processor 204 determines that the at least one candidate region includes the region 110*a* and 110*b*, the processor 204 may combine the lighting information of each of the region 110*a* and 110*b* into the reference lighting information.

In one embodiment, the processor 204 may combine the lighting information of each of the at least one candidate region into the reference lighting information via performing a linear/non-linear/weighted combination to the lighting information of each of the at least one candidate region, but the disclosure is not limited thereto.

From another perspective, the processor 204 can not only use the lighting information of the region where the host 200 currently locates in to determine the reference lighting information, but also can take the lighting information of other adjacent region into consideration when determining the reference lighting information.

In step S350, the processor 204 renders the to-be-rendered virtual object based on the reference lighting information. In the embodiment, since the reference lighting information can better characterize the lighting information corresponding to the to-be-rendered virtual object, the light on the rendered virtual object would be more consistent with the environment.

Figure 7:
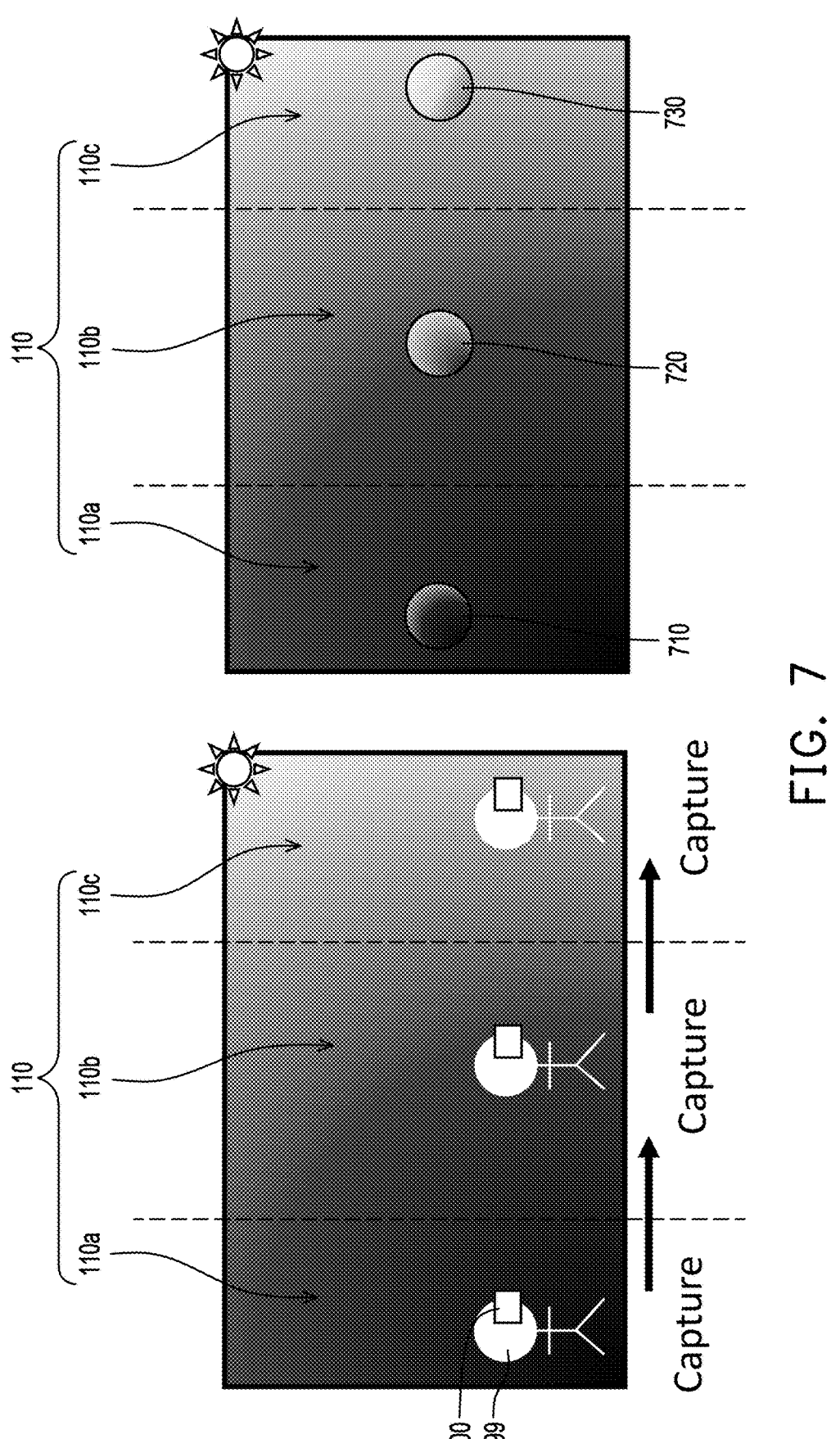
FIG. 7 shows an application scenario according to FIG. 4.

See FIG. 7, which shows an application scenario according to FIG. 4. In FIG. 7, the host 200 can determine the lighting information of each of the regions 110*a*-110*c* when the user 199 moves from the regions 110*a*-110*c*.

In one embodiment, for a to-be-rendered virtual object 710 locates in the region 110*a* (e.g., the virtual object 710 is expected to be shown/displayed within the region 110*a* after being rendered), the processor 204 may determine the corresponding reference lighting information as the lighting information of the region 110*a*. In this case, the processor 204 may render the to-be-rendered virtual object 710 based on the corresponding reference lighting information (e.g., the lighting information of the region 110*a*) and display the rendered virtual object 710 at the corresponding specific position in the region 110*a*.

In another embodiment, the processor 204 can determine the reference lighting information corresponding to the to-be-rendered virtual object 710 via combining the lighting information of the region 110*a* and 110*b* since the to-be-rendered virtual object 710 is near the region 110*b*, but the disclosure is not limited thereto.

As shown in FIG. 7, the light on the rendered virtual object 710 can be consistent with the region 110*a* (which may be a dark region in the environment 110). More specifically, the rendered virtual object 710 would seem to be dark, which better matches the light situation of the region 110*a*.

In one embodiment, for a to-be-rendered virtual object 720 locates in the region 110*b* (e.g., the virtual object 720 is expected to be shown/displayed within the region 110*b* after being rendered), the processor 204 may determine the corresponding reference lighting information as the lighting information of the region 110*b*. In this case, the processor 204 may render the to-be-rendered virtual object 720 based on the corresponding reference lighting information (e.g., the lighting information of the region 110*b*) and display the rendered virtual object 720 at the corresponding specific position in the region 110*b*.

In another embodiment, the processor 204 can determine the reference lighting information corresponding to the to-be-rendered virtual object 720 via combining the lighting information of the region 110*b* with the lighting information of the region 110*a* and/or the lighting information of the region 110*c* since the to-be-rendered virtual object 720 is near the regions 110*a* and 110*c*, but the disclosure is not limited thereto.

As shown in FIG. 7, the light on the rendered virtual object 720 can be consistent with the region 110*b* (which may be a less dark region in the environment 110). More specifically, the rendered virtual object 720 would seem to be brighter than the rendered virtual object 710, which better matches the light situation of the region 110*b* since the region 110*b* is brighter than the region 110*a*.

In one embodiment, for a to-be-rendered virtual object 730 locates in the region 110*c* (e.g., the virtual object 730 is expected to be shown/displayed within the region 110*c* after being rendered), the processor 204 may determine the corresponding reference lighting information as the lighting information of the region 110*c*. In this case, the processor 204 may render the to-be-rendered virtual object 730 based on the corresponding reference lighting information (e.g., the lighting information of the region 110*c*) and display the rendered virtual object 730 at the corresponding specific position in the region 110*c*.

In another embodiment, the processor 204 can determine the reference lighting information corresponding to the to-be-rendered virtual object 730 via combining the lighting information of the region 110*b* and 110*c* since the to-be-rendered virtual object 730 is near the region 110*b*, but the disclosure is not limited thereto.

As shown in FIG. 7, the light on the rendered virtual object 730 can be consistent with the region 110*c* (which may be a bright region in the environment 110). More specifically, the rendered virtual object 730 would seem to be brighter than the rendered virtual object 720, which better matches the light situation of the region 110*c* since the region 110*c* is brighter than the region 110*b*.

In some embodiments, the processor 204 may store the obtained lighting information of each of the regions 110*a*-110*c* in, for example, a database associated with the environment 110. In this case, when the host 200 comes to the environment 110 for the next time, the processor 204 may directly retrieve the lighting information of each of the regions 110*a*-110*c* from the database, which may save the computing effort of the host 200.

The disclosure further provides a computer readable storage medium for executing the method for rendering a virtual object. The computer readable storage medium is composed of a plurality of program instructions (for example, a setting program instruction and a deployment program instruction) embodied therein. These program instructions can be loaded into the host 200 and executed by the same to execute the method for rendering a virtual object and the functions of the host 200 described above.

To sum up, the embodiments of the disclosure provide a solution for better determining the corresponding lighting information of the to-be-rendered virtual object, such that the light on the rendered virtual object can be more consistent with the environment. Accordingly, the user may have a better visual experience.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for rendering a virtual object, applied to a host, comprising:
   determining, by the host, a plurality of regions in an environment;
   determining, by the host, lighting information of each of the plurality of regions;
   obtaining, by the host, a to-be-rendered virtual object and selecting, by the host, at least one candidate region corresponding to the to-be-rendered virtual object among the plurality of regions, wherein the plurality of regions comprise a first region, and the step of selecting the at least one candidate region corresponding to the to-be-rendered virtual object among the plurality of regions comprises:
      in response to determining that the to-be-rendered virtual object locates in the first region, at least selecting the first region as the at least one candidate region;
   determining, by the host, a reference lighting information based on the lighting information of each of the at least one candidate region; and
   rendering, by the host, the to-be-rendered virtual object based on the reference lighting information,
   updating, by the host, the lighting information of at least one of the plurality of regions in response to a movement of the host.

2. The method according to claim 1, wherein the plurality of regions comprise the first region, and the step of determining the lighting information of each of the plurality of regions comprises:
   determining a first reference point in the first region;
   determining first lighting information of the first reference point in the first region; and
   determining the first lighting information of the first reference point as the lighting information of the first region.

3. The method according to claim 2, wherein the first reference point in the first region is a center point of the first region.

4. The method according to claim 2, wherein the step of determining the first lighting information of the first reference point in the first region comprises:
   in response to determining that the host locates in the first region, capturing a first environmental image associated with the first region, wherein the first environmental image comprises at least one of a panorama and a cubemap; and
   determining the first lighting information of the first reference point in the first region based on the first environmental image associated with the first region.

5. The method according to claim 4, wherein the step of determining the first lighting information of the first reference point in the first region based on the first environmental image associated with the first region comprises:
   in response to determining that the first environmental image is captured at a first location within the first region, determining a first relative position between the first location and the first reference point;
   calibrating the first environmental image based on the first relative position, wherein the calibrated first environmental image corresponds to a viewing angle of the host at the first reference point to the environment; and
converting the calibrated first environmental image into the first lighting information of the first reference point.

6. The method according to claim 2, wherein the plurality of regions comprise the first region and a second region adjacent to each other, and the method further comprises:
after determining the lighting information of the first region, accordingly determining the lighting information of the second region.

7. The method according to claim 1, wherein the plurality of regions further comprise a second region adjacent to the first region, and the step of at least selecting the first region as the at least one candidate region comprises:
selecting the first region and the second region as the at least one candidate region.

8. The method according to claim 1, wherein the step of determining the reference lighting information based on the lighting information of each of the at least one candidate region comprises:
combining the lighting information of each of the at least one candidate region into the reference lighting information.

9. A host, comprising:
a non-transitory storage circuit, storing a program code; and
a processor, coupled to the non-transitory storage circuit and accessing the program code to perform:
determining a plurality of regions in an environment;
determining lighting information of each of the plurality of regions;
obtaining a to-be-rendered virtual object and selecting at least one candidate region corresponding to the to-be-rendered virtual object among the plurality of regions, wherein the plurality of regions comprise a first region;
in response to determining that the to-be-rendered virtual object locates in the first region, at least selecting the first region as the at least one candidate region;
determining a reference lighting information based on the lighting information of each of the at least one candidate region; and
rendering the to-be-rendered virtual object based on the reference lighting information; and
updating the lighting information of at least one of the plurality of regions in response to a movement of the host.

10. The host according to claim 9, wherein the plurality of regions comprise the first region, and the processor performs:
determining a first reference point in the first region;
determining first lighting information of the first reference point in the first region; and
determining the first lighting information of the first reference point as the lighting information of the first region.

11. The host according to claim 10, wherein the first reference point in the first region is a center point of the first region.

12. The host according to claim 10, wherein the plurality of regions comprise the first region and a second region adjacent to each other, and the processor performs:

after determining the lighting information of the first region, accordingly determining the lighting information of the second region.

13. The host according to claim 9, wherein the plurality of regions comprise the first region, and the processor performs:
in response to determining that the host locates in the first region, capturing a first environmental image associated with the first region, wherein the first environmental image comprises at least one of a panorama and a cubemap; and
determining the first lighting information of the first reference point in the first region based on the first environmental image associated with the first region.

14. The host according to claim 13, wherein the first region comprises a first reference point, and after capturing the first environmental image associated with the first region, the processor further performs:
in response to determining that the first environmental image is captured at a first location within the first region, determining a first relative position between the first location and the first reference point;
calibrating the first environmental image based on the first relative position, wherein the calibrated first environmental image corresponds to a viewing angle of the host at the first reference point to the environment; and
converting the calibrated first environmental image into the first lighting information of the first reference point.

15. The host according to claim 9, wherein the processor performs:
in response to determining that the to-be-rendered virtual object locates in the first region, selecting a second region as the at least one candidate region.

16. The host according to claim 9, wherein the processor performs:
combining the lighting information of each of the at least one candidate region into the reference lighting information.

17. A non-transitory computer readable storage medium, the computer readable storage medium recording an executable computer program, the executable computer program being loaded by a host to perform steps of:
determining a plurality of regions in an environment;
determining lighting information of each of the plurality of regions;
obtaining a to-be-rendered virtual object and selecting at least one candidate region corresponding to the to-be-rendered virtual object among the plurality of regions, wherein the plurality of regions comprise a first region,
in response to determining that the to-be-rendered virtual object locates in the first region, at least selecting the first region as the at least one candidate region;
determining a reference lighting information based on the lighting information of each of the at least one candidate region; and
rendering the to-be-rendered virtual object based on the reference lighting information,
updating the lighting information of at least one of the plurality of regions in response to a movement of the host.

* * * * *